US008275475B2

(12) United States Patent
Trautmann et al.

(10) Patent No.: US 8,275,475 B2
(45) Date of Patent: Sep. 25, 2012

(54) METHOD AND SYSTEM FOR ESTIMATING FREQUENCY AND AMPLITUDE CHANGE OF SPECTRAL PEAKS

(75) Inventors: Steven David Trautmann, Ibaraki (JP); Atsuhiro Sakurai, Ibaraki (JP); Ryo Tsutsui, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1073 days.

(21) Appl. No.: 12/193,678

(22) Filed: Aug. 18, 2008

(65) Prior Publication Data

US 2009/0062945 A1 Mar. 5, 2009

Related U.S. Application Data

(60) Provisional application No. 60/969,082, filed on Aug. 30, 2007.

(51) Int. Cl.
*G06F 17/00* (2006.01)

(52) U.S. Cl. .......................................................... 700/94

(58) Field of Classification Search ..................... 700/94
See application file for complete search history.

(56) References Cited

U.S. PATENT DOCUMENTS

| | | | | |
|---|---|---|---|---|
| 5,029,509 | A * | 7/1991 | Serra et al. | 84/625 |
| RE36,478 | E * | 12/1999 | McAulay et al. | 704/206 |
| 6,108,609 | A * | 8/2000 | Qian et al. | 702/66 |
| 7,272,556 | B1 * | 9/2007 | Aguilar et al. | 704/230 |
| 2003/0061047 | A1 * | 3/2003 | Yoshioka et al. | 704/258 |
| 2008/0249644 | A1 * | 10/2008 | Jehan | 700/94 |

OTHER PUBLICATIONS

J. O. Smith and X. Serra, "PARSHL: An Analysis/Synthesis Program for Non-Harmonic Sounds Based on a Sinusoidal Representation", Proceedings of Int. Computer Music Conf., 1987, pp. 1-22.

A. S. Master and Y. Liu, "Robust Chirp Parameter Estimation for Hann Windowed Signals", Proceedings of IEEE Int. Conf. on Multimedia and Exposition 2003, pp. 717-720.

M. Abe and J. Smith, "AM/FM Rate Estimation for Time-Varying Sinusoidal Modeling," Proc. IEEE International Conference on Acoustics, Speech, and Signal Processing (ICASSP 05), Mar. 18-23, 2005, pp. 201-204, vol. 3, issue 2.

* cited by examiner

*Primary Examiner* — Paul McCord

(74) *Attorney, Agent, or Firm* — Ronald O. Neerings; Wade James Brady, III; Frederick J. Telecky, Jr.

(57) ABSTRACT

Methods, digital systems, and computer readable media are provided for estimating change of amplitude and frequency in a digital audio signal by transforming a frame of the digital audio signal to the frequency domain, locating a frequency peak in the transformed frame, determining an interpolated peak of the located frequency peak, computing inner products of a portion of the transformed frame about the interpolated peak with a plurality of test signals, and estimating change of amplitude and change of frequency for the frequency peak from results of the inner products.

17 Claims, 6 Drawing Sheets

METHOD AND SYSTEM FOR ESTIMATING FREQUENCY AND AMPLITUDE CHANGE OF SPECTRAL PEAKS

CROSS-REFERENCE TO RELATED APPLICATIONS

This application claims priority from provisional application No. 60/969,082, filed Aug. 30, 2007, which is incorporated herein by reference.

BACKGROUND

A widely used technique in digital signal analysis is the application of the fast Fourier transform (FFT) to transform the signal from the time domain to the frequency domain. Often the signal to be transformed is windowed prior to the application of the FFT. The resulting spectrum represents the windowed signal as projected onto a basis consisting of complex sinusoids. The complex coefficients of these projections can be interpreted as the amplitude and phase of a particular stationary frequency in the original windowed signal. However, this representation as a collection of stationary signals is not an accurate model for many audio signals. In many instances, a more useful model of the audio signal would include fewer sinusoidal peaks which are not stationary. For instance, having a more accurate model of the underlying original sound sources is vital in applications such as computational auditory scene analysis, where the goal is to separate a mixed signal into individual sound sources. For such applications, having as much information as possible about how sinusoid components are continuously changing in frequency and amplitude is desirable. Obtaining more such information about an audio signal requires further processing of the spectra obtained from an FFT.

Peak tracking is one approach to estimating changes in frequency and amplitude. An example of this approach is found in J. O. Smith and X. Serra, "PARSHL: A PARSHL: An Analysis/Synthesis Program for Non-Harmonic Sounds Based on a Sinusoidal Representation", Proceedings of Int. Computer Music Conf., 1987, pp. 1-22. However, to track peaks accurately, it is often necessary to use a short step size, which increases the number of FFTs taken, thus increasing the computational cost. In addition, it is difficult to track peaks which cross each other.

Another approach to estimating changes in frequency and amplitude is found in A. S. Master and Y. Liu, "Robust Chirp Parameter Estimation for Hann Windowed Signals", Proceedings of IEEE Int. Conf. on Multimedia and Exposition 2003, pp. 717-720. This approach relies on the fact that FFT bins near an estimated peak contain further information which is useful in estimating the trajectory of amplitude and pitch of the sinusoid without requiring the additional spectral frames of peak tracking. More specifically, the approach in Master solves analytically for the trajectory information by estimation of a chirp (linear frequency ramp) parameter using Fresnel integral approximation (for large parameters) and Taylor series expansions (for small parameters).

SUMMARY

Embodiments of the invention provide methods, systems, and computer readable media for estimating frequency and amplitude change of spectral peaks in digital signals using correlations (short inner products) with test signals.

BRIEF DESCRIPTION OF THE DRAWINGS

Particular embodiments in accordance with the invention will now be described, by way of example only, and with reference to the accompanying drawings.

DETAILED DESCRIPTION

Figure 1:
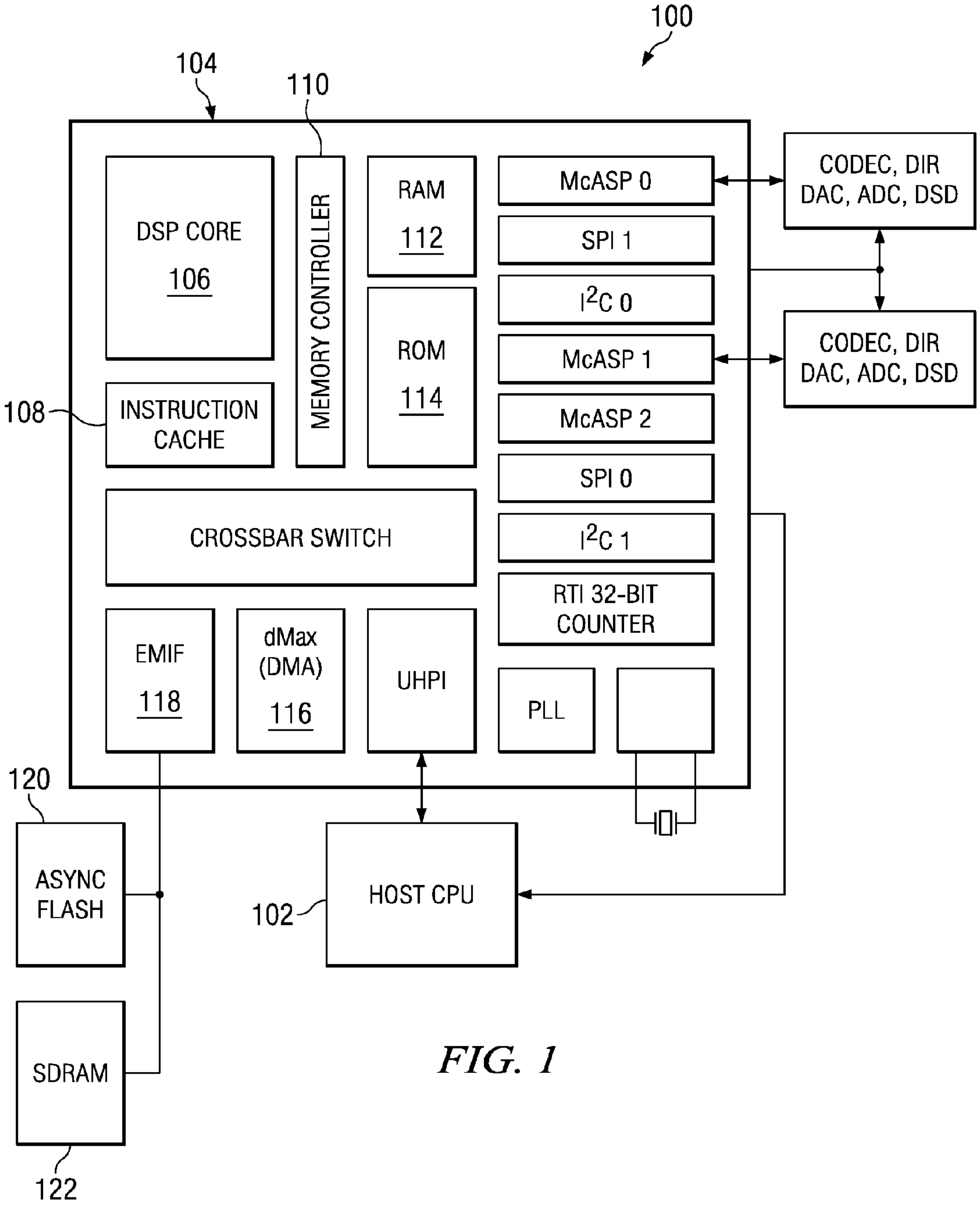
FIG. 1 shows a block diagram of an illustrative digital system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

In general, embodiments of the invention provide methods and systems for estimating frequency and amplitude change of spectral peaks in digital signals such as digital audio signals. More specifically, embodiments of the invention provide for comparing FFT bins near an estimated peak to the neighboring FFT bins of a set of test signals. If a sufficient number of test signals are used, the closest test signal or an interpolation can indicate that the peak in question has a particular amplitude and frequency trajectory. As is explained in more detail below, the bin comparison is done by means of an inner product with a set of normalized test signals to determine how similar each test signal is to the original audio signal.

Embodiments of methods for estimation of frequency and amplitude change of spectral peaks in audio signals described herein may be performed on many different types of digital systems that incorporate audio processing, including, but not limited to, portable audio players, cellular telephones, AV, CD and DVD receivers, HDTVs, media appliances, set-top boxes, multimedia speakers, video cameras, digital cameras, and automotive multimedia systems. Such digital systems may include any of several types of hardware: digital signal processors (DSPs), general purpose programmable processors, application specific circuits, or systems on a chip (SoC)

which may have multiple processors such as combinations of DSPs, RISC processors, plus various specialized programmable accelerators.

FIG. 1 is an example of one such digital system (100) that may incorporate the methods for frequency and amplitude change estimation as described below. Specifically, FIG. 1 is a block diagram of an example digital system (100) configured for receiving and transmitting audio signals. As shown in FIG. 1, the digital system (100) includes a host central processing unit (CPU) (102) connected to a digital signal processor (DSP) (104) by a high speed bus. The DSP (104) is configured for multi-channel audio decoding and post-processing as well as high-speed audio encoding. More specifically, the DSP (104) includes, among other components, a DSP core (106), an instruction cache (108), a DMA engine (dMAX) (116) optimized for audio, a memory controller (110) interfacing to an onchip RAM (112) and ROM (114), and an external memory interface (EMIF) (118) for accessing offchip memory such as Flash memory (120) and SDRAM (122). In one or more embodiments of the invention, the DSP core (106) is a 32-/64-bit floating point DSP core. In one or more embodiments of the invention, the methods described herein may be partially or completely implemented in computer instructions stored in any of the onchip or offchip memories. The DSP (104) also includes multiple multichannel audio serial ports (McASP) for interfacing to codecs, digital to audio converters (DAC), audio to digital converters (ADC), etc., multiple serial peripheral interface (SPI) ports, and multiple inter-integrated circuit ($I^2C$) ports. In one or more embodiments of the invention, the methods for frequency and amplitude change estimation described herein may be performed by the DSP (104) on frames of an audio stream after the frames are decoded.

Figure 2A:
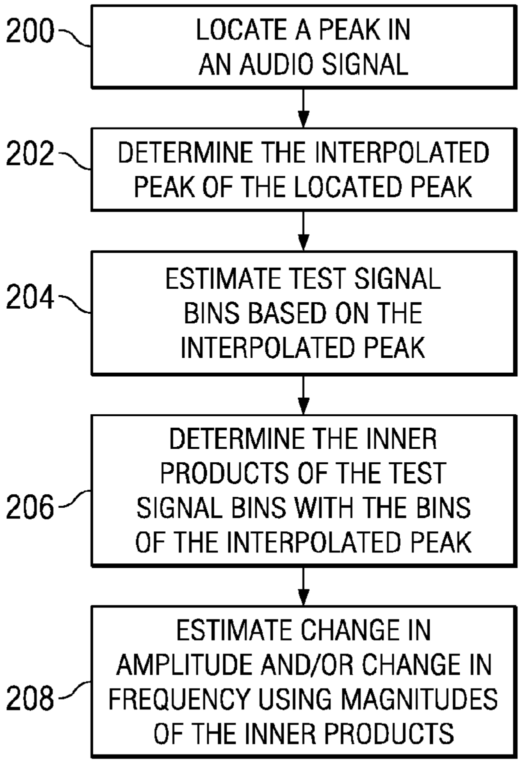
FIGS. 2A and 2B show flow diagrams of methods in accordance with one or more embodiments of the invention.

FIG. 2A shows a flow diagram of a method for estimating frequency and amplitude change in an audio signal in accordance with one or more embodiments of the invention. In summary, the illustrated method includes audio signal content detection by transforming (e.g., FFT) a frame of a digital audio signal and finding the local frequency peak(s), computing inner products (correlations) about the local frequency peak with a plurality of test signals, and estimating rates of change of amplitude and frequency for the local frequency peak from the results of said inner products. In some embodiments of the invention, the set of test signals can be small for computational simplicity by using interpolations of a positive amplitude change test signal, a negative amplitude change test signal, a positive frequency change test signal, a negative frequency change test signal, and a no change test signal.

As shown in FIG. 2A, initially a peak is located in a frame of an audio signal (200). In one or more embodiments of the invention, a peak may be located as follows. First, a frame in an audio signal (e.g., a 12 kHz audio signal) is windowed, using, for example, a 512-point Hann window. The portion of the audio signal within the window is then transformed by an FFT, for example, a 512-point FFT. One of ordinary skill in the art will appreciate that other types of windows, window lengths, and FFT lengths may be used without departing from the scope of the invention. The trade-offs involved in choosing the type of window, window length, and FFT length are similar to those of other analysis applications and approaches. However, the FFT should be at least as large as the window size, and is often chosen to be a power of two for ease of calculation. If further processing is involved such as filtering, the FFT size should be longer than the window plus the filter taps, which can be achieved by padding the windowed data with trailing zeros. Here no further processing is applied, so the FFT size and window size can be the same for maximum efficiency. However there is no problem making the FFT length longer than necessary, other than the additional computation.

After the FFT, peak bins are determined by finding bins which are larger in magnitude than their neighboring bins, and for which the neighboring bins are also larger in magnitude than their other neighbors. Neighboring bins are those bins immediately adjacent to a bin. Thus, the peak is determined when (the magnitude of) bin n is greater than bins n−1 and n+1, and bin n−1 is greater than bin n−2 and bin n+1 is greater than bin n+2.

Figure 3:
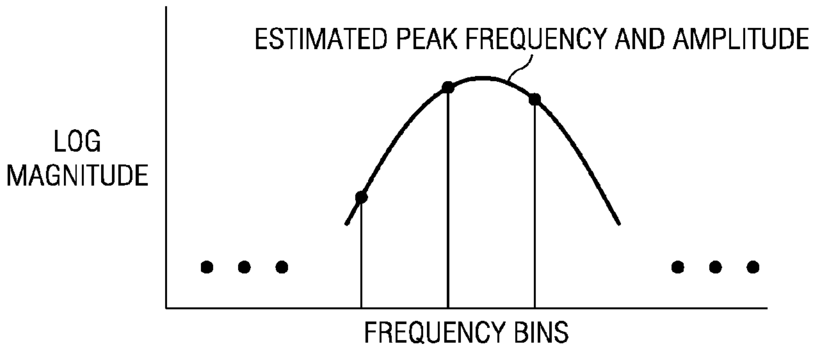
FIG. 3 shows an estimation of the frequency and amplitude of a stationary sinusoid in accordance with one or more embodiments of the invention.

The FFT gives projections of the (windowed) signal onto discrete, equally spaced frequencies. However, the original signal, even if stationary, may often be more usefully interpreted as consisting of sinusoids at frequencies other than the basic frequency bins of the FFT. To estimate a better frequency location, a peak frequency is interpolated based on the magnitude of the FFT bins near the peak (202). In one or more embodiments of the invention, a quadratic interpolation on the log magnitude of the locally highest bin and its neighbors is performed. The peak of this quadratic gives an estimation of the frequency and amplitude of a stationary sinusoid with a frequency between the FFT frequency bins as illustrated in FIG. 3. The formula for the peak offset from the locally-highest bin is derived from the Lagrangian interpolation formula by setting the derivative to 0, as is given in the equation $$\text{peak offset} = p = \frac{(dBamp_0 - dBamp_2)}{(2 \cdot dBamp_0 + 2 \cdot dBamp_2 - 4 \cdot dBamp_1)} \tag{1}$$

The actual frequency can then be found by adding the locally-highest bin number to the peak offset (fraction of a bin interval) and multiplying the result by the frequency step between bins. The estimated amplitude in decibels is given by substituting the peak offset p derived by equation (1) back into the Lagrangian interpolation formula, as shown by the equation:

$$\text{peak } dBamp = \frac{(dBamp_0 \cdot (p^2 - p) + dBamp_2 \cdot (p^2 + p) - 2 \cdot dBamp_1 \cdot (p^2 - 1))}{2} \tag{2}$$

Note that $-\frac{1}{2} \leqq p \leqq \frac{1}{2}$ with equality only in the degenerate cases of $dBamp_0 = dBamp_1$ or $dBamp_2 = dBamp_1$. In FIG. 3, the left bin log magnitude is $dBamp_0$, the center (locally-highest) bin log magnitude is $dBamp_1$, and the right bin log magnitude is $dBamp_2$:

The peak of the quadratic (i.e., the interpolated peak) is considered to be the estimated local peak bin offset. Once the interpolated peak is determined, test signal bins are estimated based on this peak (204). In some embodiments of the invention, the estimated local peak bin offset is added to the largest local bin and given to a function which uses cubic splines to estimate the test signal bins. In one or more embodiments of the invention, ten cubic splines are used to interpolate five complex test signals, each with a length of seven values. More specifically, the complex values of each of the test signals are generated by two cubic spline interpolations, one for the real value and one for the imaginary value of the test signal. The generation of the cubic splines is described in more detail below in reference to FIG. 2B. Further, as is explained in more detail below in reference to FIG. 2B, the five complex test signals represent the maximum upward change in frequency with no change in amplitude, the maximum downward change in frequency with no change in amplitude, the maximum upward change in amplitude with no change in frequency, the maximum downward change in amplitude with no change in frequency, and no change in frequency or amplitude.

Once the test signal bins are estimated, the inner products of the estimated test signal bins with the bins of the interpolated peaks are determined (206). Since most of the information and energy related to a peak is located around that peak, the inner product may exclude data more than a small number of frequency bins away from the interpolated peak frequency. In one or more embodiments of the invention, this small number of frequency bins is four. Empirical analysis showed that for a window size of 512, data more than four frequency bins away from the interpolated peak frequency is not useful to determine the trajectory of the peak (the farther from a peak, the less a frequency bin is relevant to that peak). For extremely large changes in frequency over a short time it is possible that more frequency bins would be useful for tracking. On the other hand by increasing the sampling rate and adjusting the window and FFT size, it should be possible to 'slow down' the changes (relative to the frame rate) so that four frequency bins on each side are again adequate.

Thus, in some embodiments of the invention where four bins are used, the inner product merely requires seven complex multiplies and additions with little loss in accuracy and possibly even a benefit in some cases by reducing the influence of other peaks on the inner product. Another benefit of using this shortened inner product is that all the inner products (not involving DC or Nyquist frequencies) become virtually identical on a linear scale regardless of frequency location. Therefore, the same complex test signals can be used on peaks with the same interpolated position between bins, regardless of whether the bins represent low or high frequencies. Accordingly, in one or more embodiments of the invention, the inner products of the previously mentioned five complex test signals with the seven complex values from the bins of the spectrum around the interpolated peak are determined. Then, the magnitude of each of the inner products is taken. For each of the five complex test signals, the corresponding splines are sampled at seven different locations to generate the seven complex numbers for the inner product.

Finally, the change in amplitude and/or the change in frequency are estimated using the magnitudes of the inner products (208). In one or more embodiments of the invention, the change in frequency is estimated by a quadratic interpolation made with the results from the inner products with the test signals which represent upward, downward and no change in frequency. The quadratic interpolation done is similar to that done in equation (1), restated for clarity as $$est.\ freq.\ \text{change} = \frac{(mag_1 - mag_3)}{(2 \cdot mag_1 + 2 \cdot mag_3 - 4 \cdot mag_2)} \quad (3)$$

where $mag_1$ is the magnitude of the inner product with the complex value of the spline corresponding to the test signal representing the upward change in frequency, $mag_3$ is the magnitude of the inner product with the complex value of the spline corresponding to the test signal representing the downward change in frequency, and $mag_2$ is the magnitude of the inner product with the complex value of the spline corresponding to the test signal representing no change in frequency. The peak of this quadratic is the estimate of the change in frequency (given in bins).

Similarly, in one or more embodiments of the invention, the change in amplitude is estimated by a quadratic interpolation made with the results from inner products with the test signals which represent upward, downward, and no change in amplitude. The quadratic interpolation done is similar to that done in equation (1) or (3), restated for clarity as $$est.\ amp.\ \text{change} = \frac{(mag_0 - mag_4)}{(2 \cdot mag_0 + 2 \cdot mag_4 - 4 \cdot mag_2)} \quad (4)$$

where $mag_0$ is the magnitude of the inner product with the complex value of the spline corresponding to the test signal representing the upward change in amplitude, $mag_4$ is the magnitude of the inner product with the complex value of the spline corresponding to the test signal representing the downward change in amplitude, and $mag_2$ is the magnitude of the inner product with the complex value of the spline corresponding to the test signal representing no change in amplitude. The peak of this quadratic is the estimate of the change in amplitude.

Figure 2B:
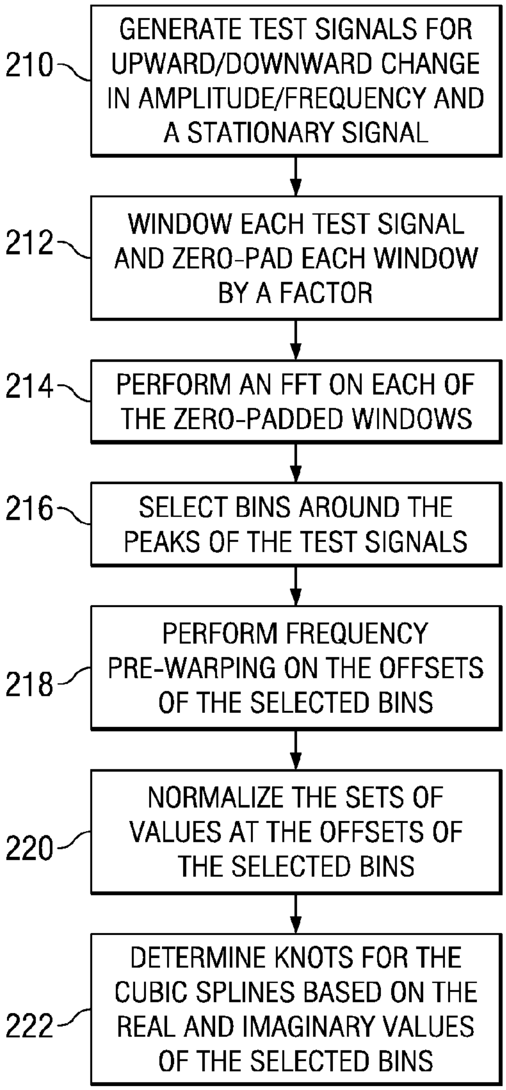

FIG. 2B shows a flow diagram of a method for generating the cubic splines used to estimate the complex test signals in accordance with one or more embodiments of the invention. In one or more embodiments of the invention, rather than testing against each possible test signal within a given range of amplitude and frequency change, test signal bins for five test signals are estimated. These five test signals represent the maximum upward change in frequency with no change in amplitude, the maximum downward change in frequency with no change in amplitude, the maximum upward change in amplitude with no change in frequency, the maximum downward change in amplitude with no change in frequency, and no change in frequency or amplitude. In one or more embodiments of the invention, the changes (over the frame length) represented by the test signals are up or down in frequency by 0.33 frequency bins, and up or down in amplitude with a maximum at plus 6 dB and a minimum at minus infinity. Other values for the changes may be used but the larger the range, the lesser the accuracy. Thus, the ranges used should be wide enough that the expected changes in frequency and amplitude will lie within the range, but still as narrow as possible to make the estimations more accurate. Also it helps with interpolation if the bounds are symmetrical around "no change" but this is not a requirement. Further, the splines used to approximate the test signals are derived from thirty-three locations on or between the seven bins around a peak frequency, with separate splines for the real and imaginary parts.

As shown in FIG. 2B, first five real test signals with the above changes in frequency and amplitude are created (210). Each test signal is derived from a sine wave with a frequency around an arbitrarily chosen number of cycles per frame. The frequency may be chosen arbitrarily since all frequencies not touching the lowest or highest bin are virtually identical. In one or more embodiments of the invention, the number of cycles per frame is twenty-three.

Each test signal is then windowed and zero-padded by a factor (212). In one or more embodiments of the invention, a 512-length Hann window is used and, and the resulting window is zero-padded by a factor of four to length 2048. Other window types may be used, but the window type and length used for the test signals should be identical to the window type and length used for locating the peak in the frame of the audio signal. The goal of zero padding is to get interpolated data points between bins. Other factors for zero-padding may also be used. However, the splines are used for additional interpolation, so unless additional zero padding produces values significantly different than would be achieved with the spline interpolation, there is not much value in more zero-padding. Lengths which are powers of 2 are useful for FFT implementations but any amount of zero padding could be used. A zero padded length which is not an integer multiple of the original length would complicate matters but could be possible.

Then, an FFT of the same length as the zero-padded window is performed on each of the zero-padded windows (214). In one or more embodiments of the invention, a 2048 length FFT is performed. Following the FFTs, bins around the peaks of the test signals are selected (216). Since zero-padding in the time domain corresponds to interpolation in the frequency domain, the result of each FFT is four data points for each bin corresponding to a 512 length FFT. Thus, the seven bins around each of the peaks of the test signals appear with four offsets each. More specifically, zero-padding a length 512 signal to length 2048 and taking a FFT gives four data points for each data point of a 512 length FFT. Every 4th bin is identical up to a constant scaling with the non-zero padded 512 length transform. The other 3 bins are just an interpolation in between the 'real data'. This is what was meant by 4 offsets (like at the original bin, ¼ of the way to next bin, ½ way to the next bin, and ¾ of the way to the next bin). This is true of all bins, including the seven neighboring bins that are used.

If the interpolation formula (1) is applied to the values with bin offset of 0.25, then the result is not exactly 0.25 due to inaccuracy in the peak estimation (i.e., the interpolated peak). To compensate for this inaccuracy, these bin offsets are pre-warped so that their position and the peak interpolation formula (1) agree (218). This pre-warping also reduces the peak estimation inaccuracy at other locations after the splines are created. After the pre-warping, the sets of values at the offsets of the selected bins are normalized (220). Each set of seven values at the different offsets may be normalized separately or together.

After normalization, the knots for the cubic splines are determined based on the real and imaginary values of the pre-normalized, pre-warped bins (222). In one or more embodiments of the invention, after normalizing and pre-warping the seven bin locations and their offsets so that knot locations correspond to their interpolated peak locations, separate splines are made from the real and imaginary part. The result is five cubic splines, each representing the real values of one of the five test signals, and five cubic splines each representing the imaginary values of one of the five test signals.

Figure 4A:
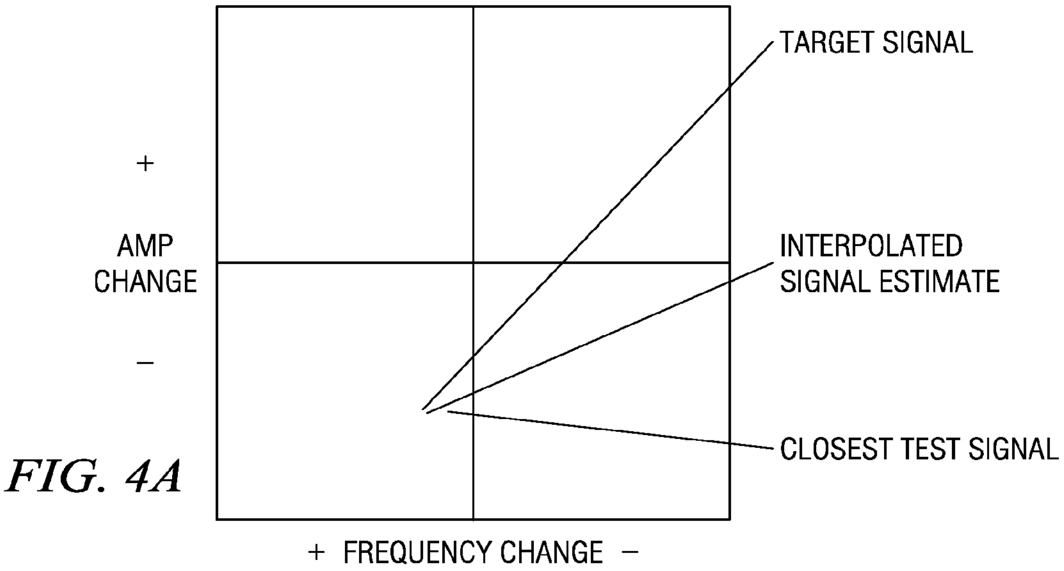
FIG. 4A is an example estimation of frequency and amplitude change in accordance with one or more embodiments of the invention.
Figure 4B:
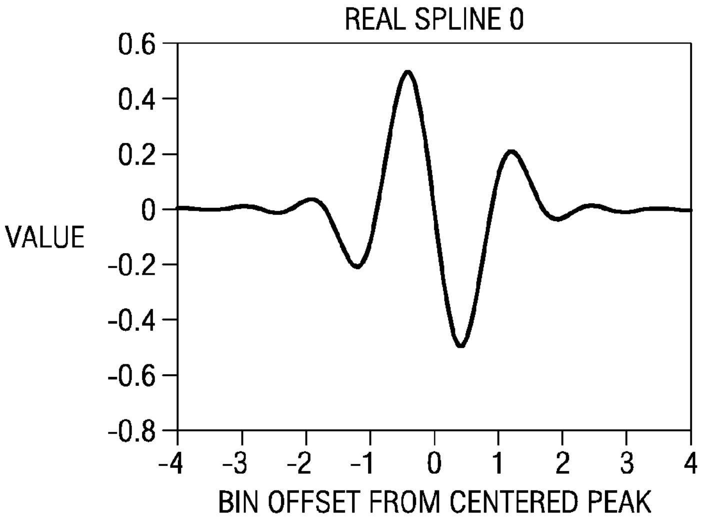
FIGS. 4B-4K are example graphs of real and imaginary parts of cubic splines in accordance with one or more embodiments of the invention.
Figure 4C:
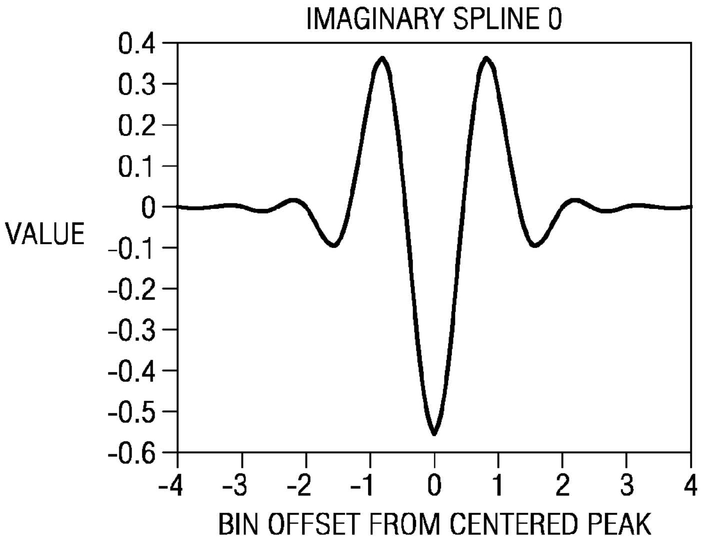
Figure 4D:
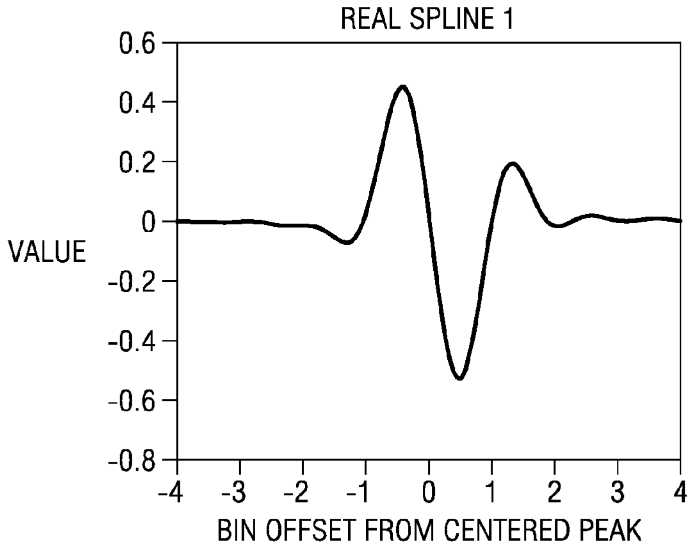
Figure 4E:
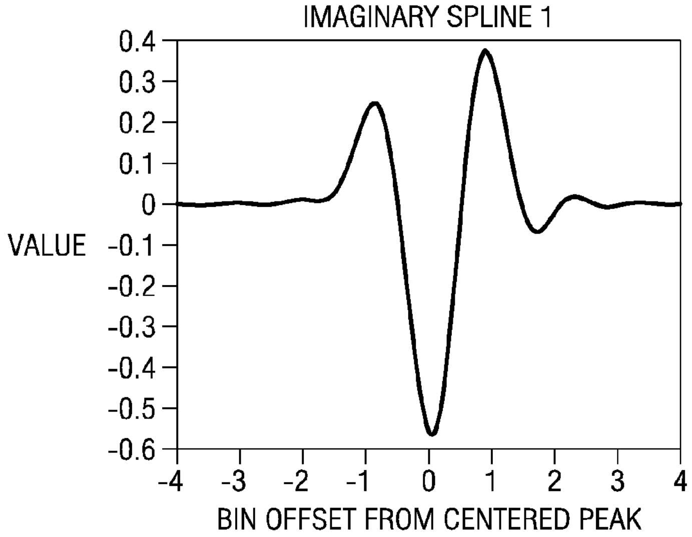
Figure 4F:
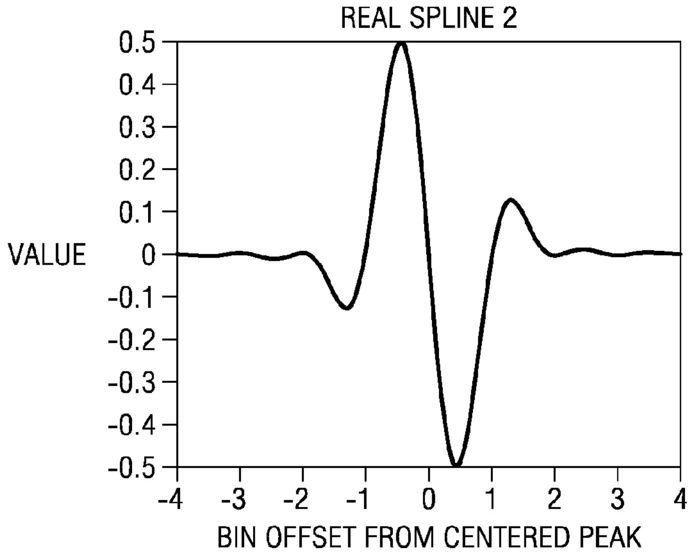
Figure 4G:
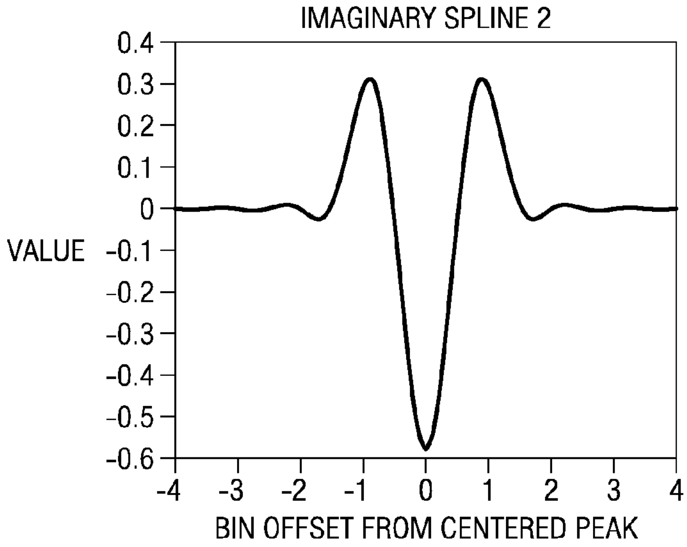
Figure 4H:
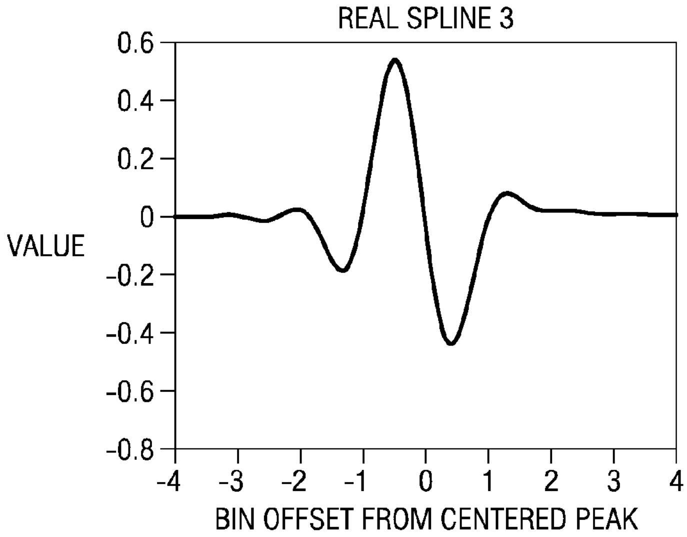
Figure 4I:
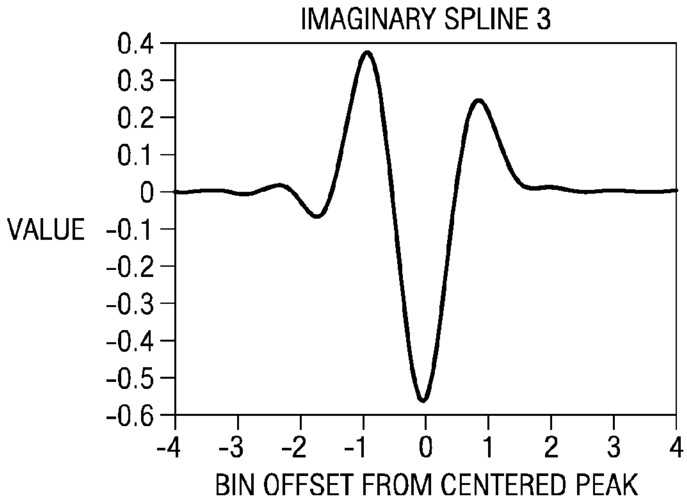
Figure 4J:
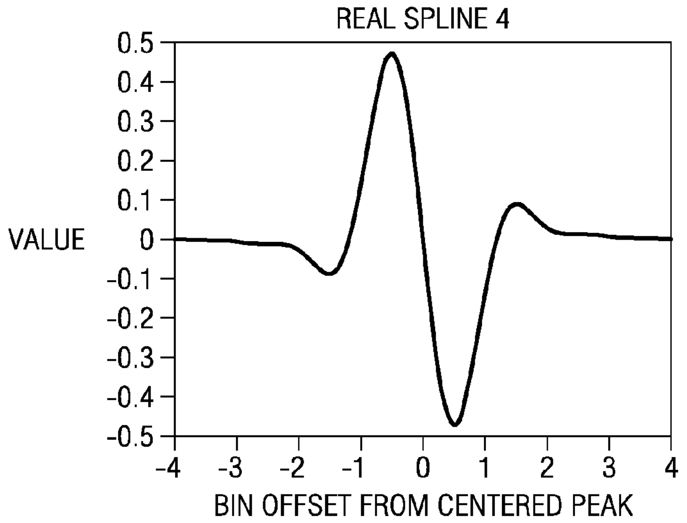
Figure 4K:
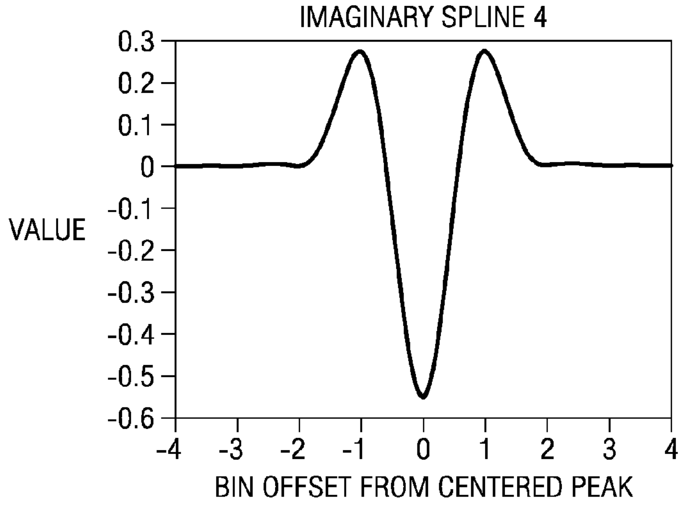

FIG. 4A shows an example estimation of change in frequency and amplitude using an embodiment of the methods of FIGS. 2A and 2B and FIGS. 4B-4K show the ten splines used. FIGS. 4B and 4C represent, respectively, the real and imaginary splines for the positive amplitude change, FIGS. 4D and 4E represent, respectively, the real and imaginary splines for the positive frequency change, FIGS. 4F and 4G represent, respectively, the real and imaginary splines for no change in frequency and amplitude, FIGS. 4H and 4I represent, respectively, the real and imaginary splines for the negative frequency change, and FIGS. 4J and 4K represent, respectively, the real and imaginary splines for the negative amplitude change.

The computation complexity of the method described herein, while not small, seems reasonable for real time applications. Once a potential peak is found, getting the estimated peak requires one division. Then, finding the five sets of seven complex values from the ten splines requires about 210 multiplies, since each spline evaluation is a cubic polynomial evaluation. The inner products require thirty-five complex multiples which can be implemented using 140 real multiplies. Then, five magnitude operations requiring five square roots and two more divisions for the final interpolations are required.

The systems and methods for estimation of frequency and amplitude change in digital signal are useful for a wide variety of applications. For example, this approach to estimation can be used to help detect speech in mixed signals by generating a feature comparing the number of peaks moving up in frequency with the number of peaks moving down in frequency. Speech, at least for some languages, tends to move down in frequency slowly, followed by shorter, faster rises in frequency. Music, on the other hand, tends to have about the same number of peaks moving downward in frequency and upward in frequency. Thus, finding that the percentage of peaks decreasing in frequency is greater than the number of peaks increasing in frequency can be an indicator that speech is present.

In another example, this approach to estimation may be used to aid in tracking peaks across frames. Peak tracking between frames often relies on some simple heuristic which often is not accurate for mixed sounds. For instance, when two harmonics from different sources cross each other, most simple peak tracking methods will be tripped up. However, by analyzing each peak, the likely direction of pitch change and amplitude change can be determined, narrowing the search for corresponding peaks in previous and subsequent frames.

Figure 5:
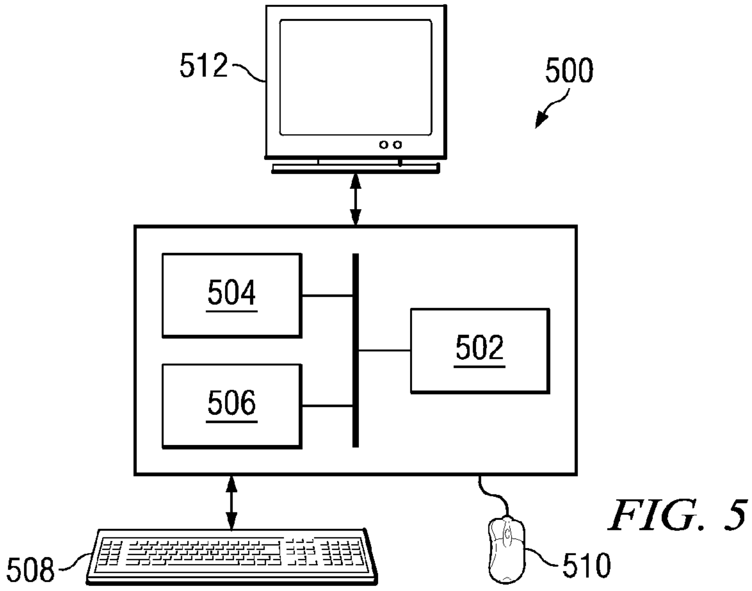
FIG. 5 shows an illustrative digital system in accordance with one or more embodiments of the invention.

As previously mentioned, embodiments of the frequency and amplitude change estimation methods and systems described herein may be implemented on virtually any type of digital system. Further examples include, but are not limited to a desk top computer, a laptop computer, a handheld device such as a mobile (i.e., cellular) phone, a personal digital assistant, a digital camera, an MP3 player, an iPod, etc). Further, embodiments may include a digital signal processor (DSP), a general purpose programmable processor, an application specific circuit, or a system on a chip (SoC) such as combinations of a DSP and a RISC processor together with various specialized programmable accelerators. For example, as shown in FIG. 5, a digital system (500) includes a processor (502), associated memory (504), a storage device (506), and numerous other elements and functionalities typical of today's digital systems (not shown). In one or more embodiments of the invention, a digital system may include multiple processors and/or one or more of the processors may be digital signal processors. The digital system (500) may also include input means, such as a keyboard (508) and a mouse (510) (or other cursor control device), and output means, such as a monitor (512) (or other display device). The digital system ((500)) may also include an image capture device (not shown) that includes circuitry (e.g., optics, a sensor, readout electronics) for capturing digital images. The digital system (500) may be connected to a network (514) (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (500) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, or any other computer readable storage device. The software instructions may be a standalone program, or may be part of a larger program (e.g., a photo editing program, a web-page, an applet, a background service, a plug-in, a batch-processing command). The software instructions may be distributed to the digital system (500) via removable memory (e.g., floppy disk, optical disk, flash memory, USB key), via a transmission path (e.g., applet code, a browser plug-in, a downloadable standalone program, a dynamically-linked processing library, a statically-linked library, a shared library, compilable source code), etc. The digital system (500) may access a digital image by reading it into memory from a storage device, receiving it via a transmission path (e.g., a LAN, the Internet), etc.

While the invention has been described with respect to a limited number of embodiments, those skilled in the art, having benefit of this disclosure, will appreciate that other embodiments can be devised which do not depart from the scope of the invention as disclosed herein. For example, although embodiments of the invention are described herein in relation to the processing of audio signals, the methods for frequency and amplitude change estimation in spectral peaks may be applied in other areas of signal processing in which FFT based spectral analysis is used. Accordingly, the scope of the invention should be limited only by the attached claims. It is therefore contemplated that the appended claims will cover any such modifications of the embodiments as fall within the true scope and spirit of the invention.

What is claimed is:

1. A method of estimating change of amplitude and frequency in a digital audio signal, the method comprising:

performing a fast Fourier transform on a window of the digital audio signal to generate a plurality of frequency bins;

locating a frequency peak bin in the plurality of frequency bins;

interpolating a peak frequency based on magnitudes of frequency bins around the frequency peak bin;

estimating frequency bins for a plurality of test signals from cubic splines, wherein the cubic splines are derived from locations around the interpolated peak frequency;

computing inner products of frequency bins around the interpolated peak frequency with the estimated frequency bins of each of the plurality of test signals; and estimating change of amplitude and change of frequency from magnitudes of the inner products.

2. The method of claim 1, wherein the cubic splines are generated by:

generating a plurality of time domain test signals;

windowing each time domain test signal of the plurality of time domain test signals;

zero-padding each window by a factor;

performing a fast Fourier transform on each zero-padded window;

selecting frequency bins around peaks in each transformed zero-padded window;

performing frequency pre-warping on offsets of the selected frequency bins;

normalizing sets of values at the offsets; and determining knots for the cubic splines based on real and imaginary values of the selected frequency bins.

3. The method of claim 1, wherein the plurality of test signals consists of a positive amplitude change test signal, a negative amplitude change test signal, a positive frequency change test signal, a negative frequency change test signal, and a no change test signal.

4. The method of claim 3, wherein estimating change of amplitude further comprises a quadratic interpolation of the magnitudes of the inner products with the estimated frequency bins of the positive amplitude change test signal, the estimated frequency bins of the negative amplitude change test signal, and the estimated frequency bins of the no change test signal.

5. The method of claim 3, wherein estimating change of frequency further comprises a quadratic interpolation of the magnitudes of the inner products with the estimated frequency bins of the positive frequency change test signal, the estimated frequency bins of the negative frequency change test signal, and the estimated frequency bins of the no change test signal.

6. The method of claim 3, wherein estimating frequency bins further comprises estimating seven frequency bins for each test signal and computing inner products further comprises computing inner products of seven frequency bins around the interpolated peak frequency with the seven estimated frequency bins of each test signal.

7. A digital system for estimating change of amplitude and frequency in a digital audio signal, the digital system comprising:

a digital signal processor; and a memory storing software instructions, wherein when executed by the digital signal processor, the software instructions cause the digital system to perform a method comprising:

performing a fast Fourier transform on a window of the digital audio signal to generate a plurality of frequency bins;

locating a frequency peak bin in the plurality of frequency bins;

interpolating a peak frequency based on magnitudes of frequency bins around the frequency peak bin;

estimating frequency bins for a plurality of test signals from cubic splines, wherein the cubic splines are derived from locations around the interpolated peak frequency;

computing inner products of frequency bins around the interpolated peak frequency with the estimated frequency bins of each of the plurality of test signals; and estimating change of amplitude and change of frequency from magnitudes of the inner products.

8. The digital system of claim 7, wherein the cubic splines are generated by:

generating a plurality of time domain test signals;

windowing each time domain test signal of the plurality of time domain test signals;

zero-padding each window by a factor;

performing a fast Fourier transform on each zero-padded window;

selecting frequency bins around peaks in each transformed zero-padded window;

performing frequency pre-warping on offsets of the selected frequency bins;

normalizing sets of values at the offsets; and determining knots for the cubic splines based on real and imaginary values of the selected frequency bins.

9. The digital system of claim 7, wherein the plurality of test signals consists of a positive amplitude change test signal, a negative amplitude change test signal, a positive frequency change test signal, a negative frequency change test signal, and a no change test signal.

10. The digital system of claim 9, wherein estimating change of amplitude further comprises a quadratic interpolation of the magnitudes of the inner products with the estimated frequency bins of the positive amplitude change test signal, the estimated frequency bins of the negative amplitude change test signal, and the estimated frequency bins of the no change test signal.

11. The digital system of claim 9, wherein estimating change of frequency further comprises a quadratic interpolation of the magnitudes of the inner products with the estimated frequency bins of the positive frequency change test signal, the estimated frequency bins of the negative frequency change test signal, and the estimated frequency bins of the no change test signal.

12. The digital system of claim 9, wherein estimating frequency bins further comprises estimating seven frequency bins for each test signal and computing inner products further comprises computing inner products of seven frequency bins around the interpolated peak frequency with the seven estimated frequency bins of each test signal.

13. A non-transitory computer readable medium comprising executable instructions to estimate change of amplitude and frequency in a digital audio signal by:

performing a fast Fourier transform on a window of the digital audio signal to generate a plurality of frequency bins;

locating a frequency peak bin in the plurality of frequency bins;

interpolating a peak frequency based on magnitudes of frequency bins around the frequency peak bin;

estimating frequency bins for a plurality of test signals from cubic splines, wherein the cubic splines are derived from locations around the interpolated peak frequency;

computing inner products of frequency bins around the interpolated peak frequency with the estimated frequency bins of each of the plurality of test signals; and estimating change of amplitude and change of frequency from magnitudes of the inner products.

14. The computer readable medium of claim 13, wherein the plurality of test signals consists of a positive amplitude change test signal, a negative amplitude change test signal, a positive frequency change test signal, a negative frequency change test signal, and a no change test signal.

15. The computer readable medium of claim 14, wherein estimating change of amplitude further comprises a quadratic interpolation of the magnitudes of the inner products with the estimated frequency bins of the positive amplitude change test signal, the estimated frequency bins of the negative amplitude change test signal, and the estimated frequency bins of the no change test signal.

16. The computer readable medium of claim 14, wherein estimating change of frequency further comprises a quadratic interpolation of the magnitudes of the inner products with the estimated frequency bins of the positive frequency change test signal, the estimated frequency bins of the negative frequency change test signal, and the estimated frequency bins of the no change test signal.

17. The computer readable medium of claim 14, wherein estimating frequency bins further comprises estimating seven frequency bins for each test signal and computing inner products further comprises computing inner products of seven frequency bins around the interpolated peak frequency with the seven estimated frequency bins of each test signal.

* * * * *